INVENTOR
Gerhard Dirks
BY
Michael S. Striker
agt.

INVENTOR
Gerhard Dirks
BY Michael S. Striker
agt.

INVENTOR
Gerhard Dirks
BY Michael S. Striker
agt.

Feb. 14, 1961 G. DIRKS 2,972,016

TELETYPING MEANS FOR THE PRINTING OR OTHER INDICATION OF NUMBERS AND OTHER INFORMATION

Filed March 30, 1955

4 Sheets-Sheet 4

INVENTOR
Gerhard Dirks

BY Michael S. Striker
agt.

United States Patent Office 2,972,016

Patented Feb. 14, 1961

2,972,016

TELETYPING MEANS FOR THE PRINTING OR OTHER INDICATION OF NUMBERS AND OTHER INFORMATION

Gerhard Dirks, 44 Morfelder Landstrasse, Frankfurt am Main, Germany

Filed Mar. 30, 1955, Ser. No. 498,041

Claims priority, application Germany Oct. 1, 1948

12 Claims. (Cl. 178—23)

The present invention relates to a means for the transmission of signals representing characters to be printed or typed or fed to some other devices and consists essentially of a method and means for converting input signals in serial order to output signals in parallel order so that each character may be printed or typed as a whole even if the original signals represent parts of the character in a predetermined sequence.

The arrangement of the present invention is useful in making visible the result of a computation performed by an electronic digital computer at a high speed. The invention may be used with the computer described in my co-pending patent application Serial No. 432,093, filed May 25, 1954.

The present application is a continuation-in-part of the application Serial No. 101,032 filed by me June 24, 1949 and entitled "Electronic Office Machine With Computing, Indicating, Printing, Storing and Sorting Mechanisms."

The invention provides a method of printing or other indication of characters wherein signal sequences representing parts of said characters are fed by a distributor into corresponding parts of a non-mechanical storage device, and are subsequently fed simultaneously from the parts of such storage device to printing or other indicating means.

The present invention is described as applied to a multi-denomination line at a time high speed printer as an example. It is evident that it can be used also with a printer for one or a few denominations and printing on the dot or line principle or otherwise.

One of the main features of the operation of the invention is the use of an electronic distributor with electronic synchronizing means and, in the case of a teletyper, the use of such distributor and synchronizer both at the transmitting and receiving ends. The distributors are preferably cathode ray distributors, the cathode ray of which is deflected in dependence on synchronizing signals on the same signal carrier as the character-representing signals.

Another feature of the invention is the use of storage means, especially those of the magnetic type, either on the transmitter or receiver side, to increase the output of the arrangements.

Figure 1:
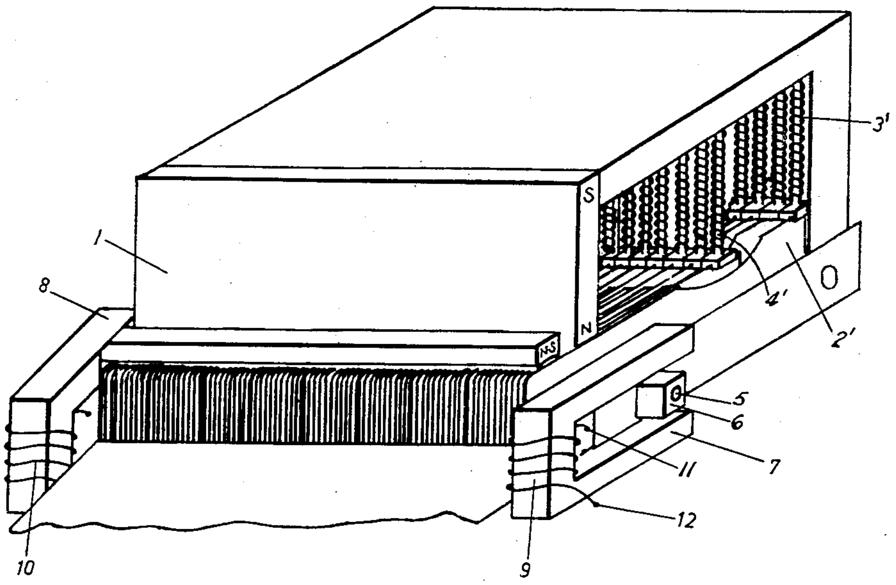
Figure 2:
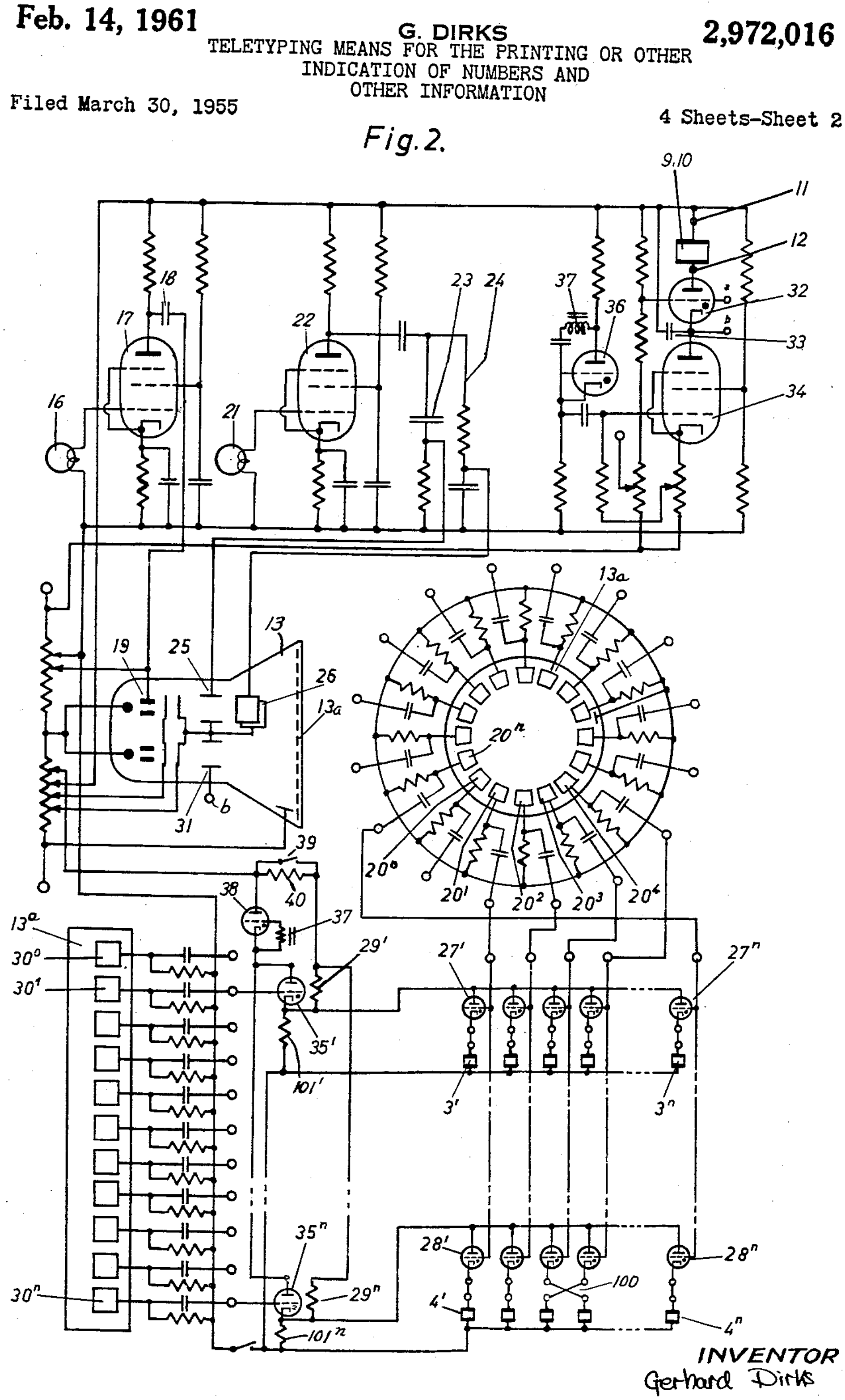
Figure 3A:
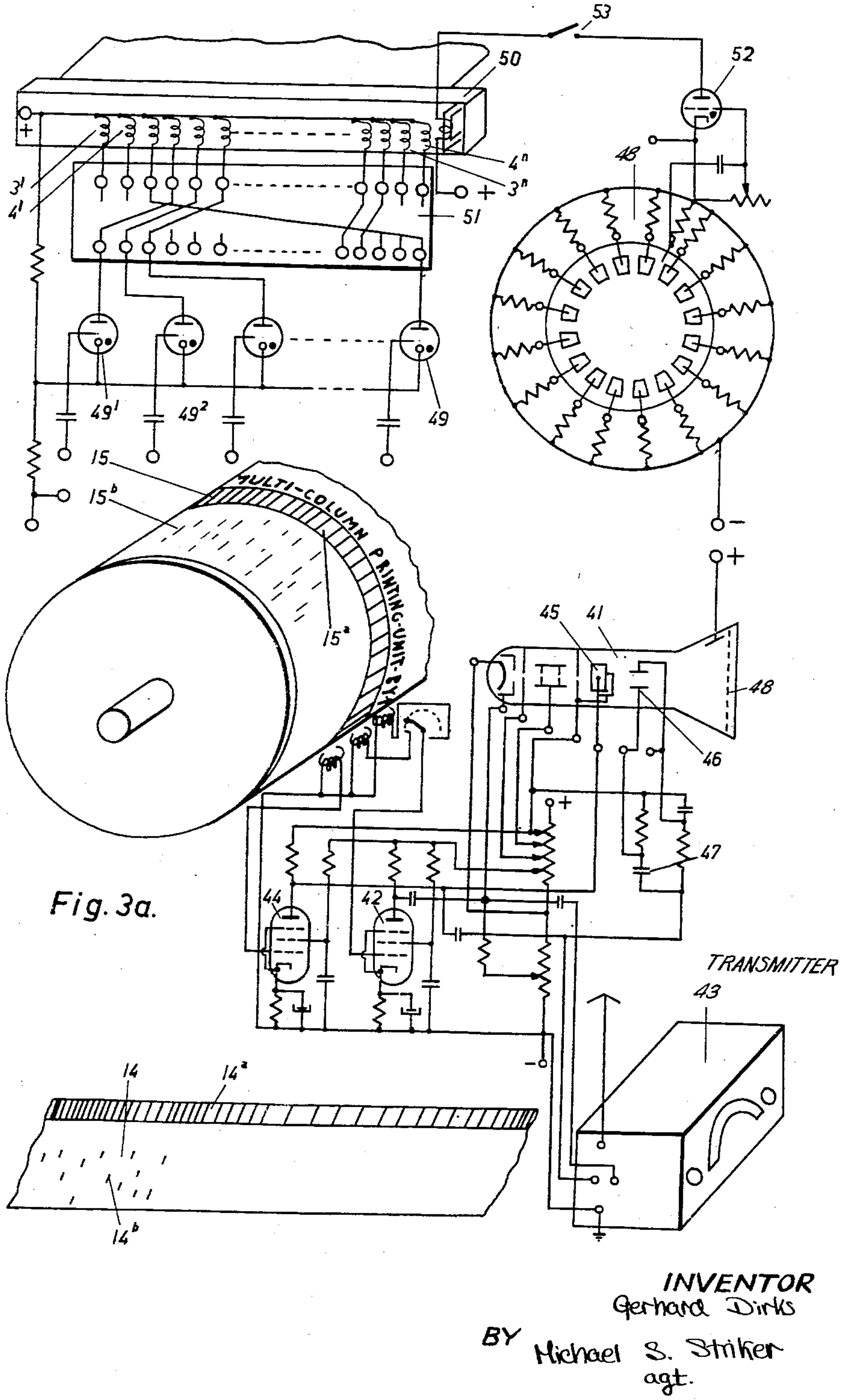
Figure 3B:
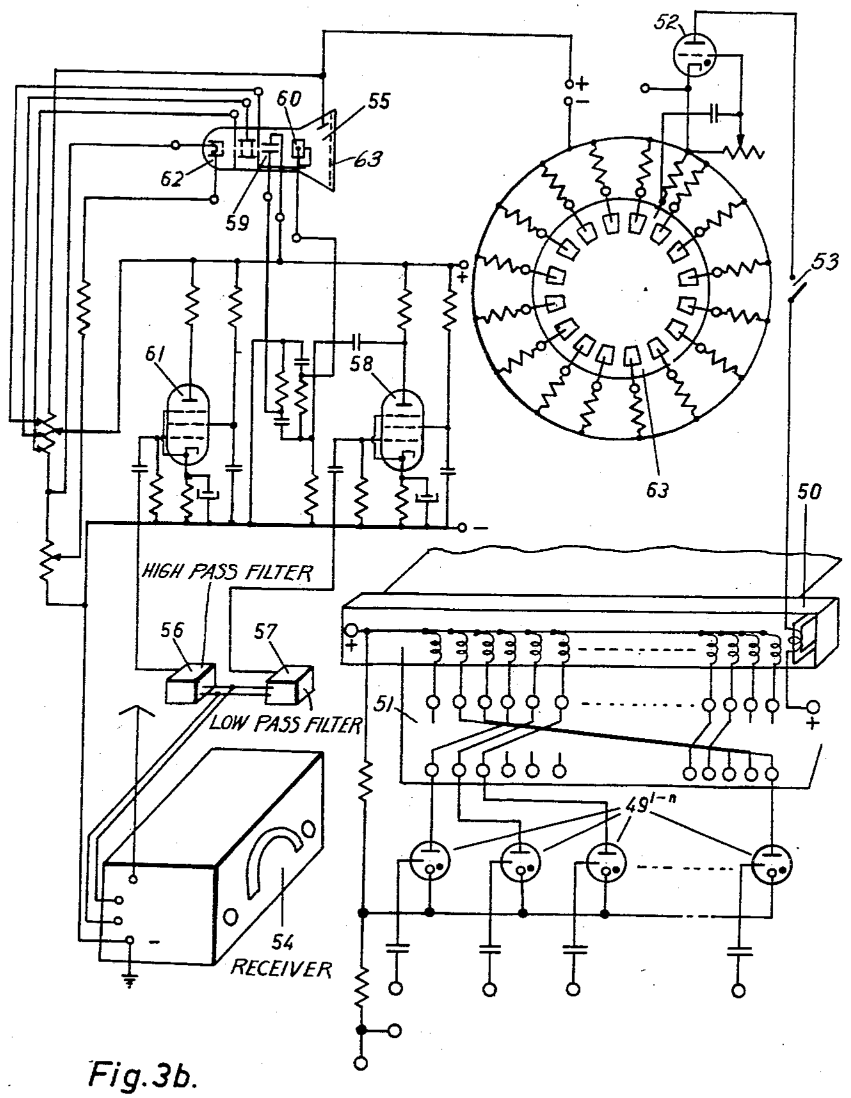

In order that the invention may be readily carried into effect, it will now be described with reference to the accompanying drawing, wherein:

Fig. 1 is a perspective view of an embodiment of a multi-denomination printer for high speed printing according to the dot or line wise principle and adapted to print in different denominations simultaneously. Such a printer forms the subject of my co-pending patent application Serial No. 432,297, filed May 25, 1954;

Fig. 2 is a schematic circuit diagram for an embodiment of an electronic synchronizing and distributing means for the control of a multi-denomination printing device of the type shown in Fig. 1; and Figs. 3*a* and 3*b* are schematic circuit diagrams of embodiments of a transmitting station and a receiving station, with a dot-wise operating multi-denomination printer, coordinated electronic synchronizing means in the form of cathode ray distributors, and alternative magnetic storage means in the form of a magnetizable drum and a magnetizable tape on the transmitting side (Fig. 3*a*).

As stated, the invention is illustrated as applied to a printing device such as described in my copending patent application, Serial No. 432,297, filed May 25, 1954, in which characters are made up of dots and/or lines in rows, the rows usually running transversely across the characters so that, with a series of side by side characters, the said transverse rows extend through all the characters, and the complete sequence of characters can be printed by the simultaneous printing of the several rows of dots and/or lines.

The invention is equally applicable to other indications of characters, such as, for example the visual indication means disclosed in my co-pending patent application, Serial No. 432,298, filed May 25, 1954.

As shown in Fig. 1, a permanent magnet 1 has its magnetic circuit completed via parts of the separate printing levers $2^{1-n}$ and the cores of the coils $3^{1-n}$ and $4^{1-n}$, these being arranged one behind the other as explained in the said copending patent application, Serial No. 432,297, filed May 25, 1954. The main shaft 5 is moved up and down by the polarized magnetized elements 6 moving between the poles of magnets 7 and 8, which are energized by an alternating current or a current controlled by electronic tubes or by contacts and flowing through the coils 9 and 10 of the magnets 7 and 8; the coil 9 having terminals 11 and 12. By energizing the magnet coils $3^{1-n}$, $4^{1-n}$ and so on, in a selective sequence depending on the sequences of parts of characters in the transverse rows of the characters which are to be printed, the printing of the different rows, collectively forming the shapes of the different characters, can be effected at high speeds. The speed is limited by the frequency which can be reached by pivoted levers controlled by magnet coils. Under the more difficult conditions of the usual relays, involving inductive and mechanical inertia, an armature frequency of 250 cycles per second in the printing devices is easily reached. The present construction reduces the restrictive effect of the inductive and mechanical inertia of the mechanism, and makes possible the printing of at least 250 dot lines per second, equalling 25 type character lines per second as a maximum speed. This output corresponds to 90,000 type character lines per hour, or in a multi-column printing unit of 100 denominations, a working limit of 250 type characters per second.

The control of the energization of the printing magnet coils is effected in the example shown by the cathode ray distributor 13 of Fig. 2. The use of this relatively simple and inexpensive delay-less distributor is preferred for the present mode of high speed printing and teleprinting because it provides easy synchronization. Of course, inductive distributors or other electronic or electric distributing means may be used for the same purpose.

The printing arrangement of Fig. 1 and the cathode ray distributor of Fig. 2 operate together in the following way. The magnetic tape 14 (Fig. 3*a*) and the magnetic storage drum 15 (Fig. 3*a*) contain synchronizing signals or frequencies at 14*a*, 15*a*, respectively, in addition to the signals at 14*b*, 15*b*, respectively, representing the different type characters to be printed. In order to print the type characters by dots or lines when they are initially represented by signals in a different code, such other signal code must be converted to a suitable code for the dot and line system of character representation. In such a case the selective storage 15 of Fig. 3*a* will be used as a converter.

In the wiring diagram of Fig. 2 the pulse sequences representing the dots or lines in the top line of the row of side-by-side type characters, which is the first row to be printed, will be sensed in sequence by a magnetic sensing head 16, one end of the winding of which is connected to the control grid of the amplifier pentode 17. The consequent variations of the plate voltage of this pentode 17 are transferred via the capacitor 18 to the negatively biassed control electrode 19 associated with one deflecting system of the double deflecting systems of the cathode ray tube 13.

The synchronization of the rotation of the cathode ray beam over the sector $20^{0-n}$ on the screen 13*a* with the movement of the storage device 14 or 15 is described in my copending patent applications Serial Nos. 498,047 and 498,048, and is effected by means of the sensing head 21 the gap of which lies opposite the sine wave synchronization signals (14*a*, 15*a*) of the storage device. One end of the coil of this sensing head 21 is connected to the control grid of pentode 22. After amplification this synchronization frequency is applied to a phase-shifting device consisting of a bridge 23, 24. One pair of opposite arms of the bridge are resistive and the other pair of arms are capacitive. The values of the bridge arms are such that the sine waves at the two output junctions of the bridge have a phase different of 90°.

The output junctions of the bridge are connected to the deflecting plate systems 25 and 26, forming part of the upper electrode system of the cathode ray tube.

The negative bias of the control electrode 19 of the upper electrode system of the cathode ray tube is such that the intensity of the cathode ray beam passing over the secondary electron emitting sectors $20^{1-n}$ of the screen 13*a* does not normally release a sufficient quantity of secondary electrons to produce an appreciable signal on the control grids of the thyratrons $27^{1-n}$ and $28^{1-n}$, and so on, if no pulse is sensed by head 16 and amplified by pentode 17. If such a pulse is sensed the control electrode 19 becomes less negative for the duration of this pulse a positive pulse being applied to the electrode 19 via the capacitor 18, connected to the plate of pentode 17, and the intensity of the cathode ray beam is increased sufficiently for the corresponding sector on which the beam is then impinging to release secondary electrons in sufficient quantities to ignite the gas discharge tubes 27, 28, and so on.

In the main discharge circuit of these discharge tubes are connected the control electromagnets $3^{1-n}$, $4^{1-n}$ of the printing unit. These are interconnected in any selected way, by manually pluggable connections 100.

The energization of the electromagnets 7 and 8 is controlled by the discharge tube 32, in the main discharge circuit of which the coils 9 and 10 of these electromagnets are connected. If no more than about 100 to 200 coils are to be energized, the control of the control grid of the discharge tube 32 can be effected by pulses taken directly from the secondary emitting line $20^0$ which pulses occur once for each rotation of the cathode ray on the screen 13*a*.

With such a number of coils $3^{1-n}$, $4^{-n}$, and corresponding sectors on the screen 13*a*, a single cathode ray tube distributor can be used. With greater numbers of coils and sectors a plurality of cathode ray tubes would be used, operating in series.

So that the cathode ray distributor may be used repeatedly within one complete printing cycle the second deflecting system of the cathode ray distributor operates one after another a series of discharge tubes under control of additional sectors $30^{1-n}$.

In this case, the igniting of the discharge tube 32 is effected by the top sector $30^0$.

The deflection of the cathode ray beam of the deflecting plate system 25—31 is controlled by capacitor 32 in the plate circuit of pentode 22, the one end of which capacitor is connected with one of said deflecting plates 25—31. With every cycle of the rotation of the cathode ray over screen 13*a* a pulse is produced by sector $20^0$, effecting the ignition of the discharge tube 36. By this means the charging pentode 34 is made conductive for a short interval, although it is normally non-conductive in consequence of a negative bias applied to the control grid via the grid-leak resistance. By this means a stepwise deflection of the cathode ray, passing over the sectors $30^0$ to $30^n$, is effected in such a way that during every rotation of the other beam, said cathode ray is deflected by one step.

At the first rotation, the cathode ray, having a predetermined intensity, ignites the discharge tube 32, via connection b, thus discharging capacitor 33. When impinging on sector 20°, the other cathode ray effects the ignition of the discharge tube 36. Capacitor 33 is charged by one unit, as described above, thus deflecting the cathode ray by one step onto sector $30^1$ and igniting the coordinated gas discharge tube $35^1$. The gas discharge tube $35^1$ produces across its cathode resistance $101^1$ a plate voltage for the discharge tubes $27^{1-n}$ of the upper row, which is just below the ignition voltage. Therefore, only this one of the rows is prepared to be ignited, if a pulse is applied to the control grids, connected in common to each sector $20^1$ to $20^n$ of the cathode ray distributor 13. Thus, only that one of the discharge tubes $27^{1-n}$ can be ignited, which receives a pulse from the sectors $20^1$ to $20^n$ and is in the row of discharge tubes, controlled by the sectors $30^1$ to $30^n$ by having plate voltage applied thereto.

One rotation of the cathode ray controlled by deflecting system 25 of the distributor the other cathode ray passes on to sector $30^2$, as a result of igniting the discharge tube 36. Through the transformer 37 a negative pulse is applied to the grid of triode 38 to make it non-conducting and momentarily interrupt the above voltage supply to the discharge tubes $35^{1-n}$. Therefore, the discharge tube $35^1$ is extinguished, but those of the discharge tubes $27^{1-n}$ which have been ignited are maintained by current through a resistance $29^1$, which supplies a voltage a little higher than the extinguishing voltage of the discharge tubes $27^{1-n}$.

During the third rotation, the discharge tubes of the second row, controlled by discharge tube $35^2$ (not shown in the drawing) will be rendered operative during the fourth rotation the third row of discharge tubes will be rendered inoperative, and so on, so that after, e.g. ten rotations of the cathode ray distributor, all the required discharge tubes will have been rendered operative. The coordinated coils $3^{1-n}$, $4^{1-n}$ and so on will be energized to ensure that the respective printing levers $2^{1-n}$ coordinated to these coils will not be effective to print.

In order to provide a substantial current pulse which is effective in the coils $3^{1-n}$ and $4^{1-n}$ the voltage of the positive pole, which, during the preparation phase described above, is only a little higher than the extinguishing voltage of the discharge tube is, shortly before the culmination point of the upward movement of shaft 5, changed over by short circuiting resistor 40 to a higher voltage, just below the ignition voltage of the discharge tubes, the change occurring during a short interval beginning shortly before and ending shortly after the said culmination point. The switch 39 can be either a contact switch controlled by the mechanical movement of shaft 5, or it can be an electronic switch controlled by a discharge tube.

Instead of the changing of the voltage from a little higher than the extinguishing voltage to a little below the ignition voltage of the discharge tubes, discharge tubes with an additional electrode can be used. Such tubes would be ignited by the ignition electrode, maintained operative by the additional electrode during the preparation cycle and operated for a short interval by the control grid and main discharge circuit between the ordinary plate and the cathode. The main discharge circuit can then only be effective for the pre-ignited discharge tubes during the short interval at the respective movements when the printing levers are at their upper culminating points. The discharge tubes can either be provided with a heated cathode (thyratron) or with a cold cathode.

The multi-column printing units can be used also for teleprinting according to Figs. 3*a* and 3*b*. In this case, the printing unit at the transmitting station is the same as described above. The intensity of the ray of the cathode ray distributor 41 is controlled by the pentode 42 which also applies the same pulses to the modulating stage of the transmitter 43. The pentode 44 transfers the synchronization frequency from the storage drum 15 or the storage tape 14 to the deflecting plate systems 45 and 46 over the phase shifting bridge 47, transferring the same frequency to the modulating stage of the transmitter 43. Both modulations are transmitted by the said transmitter.

The different sectors of the cathode ray distributor screen 48 effect the selecting ignition of the multi-denomination tubes 49$^{1-n}$ controlling the multi-denomination printing unit 50 with the coils 3$^{1-n}$, 4$^{1-n}$ (see Fig. 1) via the plug board 51. In this case, the discharge tubes 49$^{1-n}$ are shown as tubes with cold cathodes. The up and down movement of the main shaft 5 (see Fig. 1), with the several printing levers, is controlled again by the cathode ray distributor 41 by means of the discharge tube 52. The extinguishing of the discharge tube 52 is effected by breaking the circuit by means of a contact 53 controlled mechanically by the moving ends of the main shaft 5.

At the receiving station a similar arrangement exists. The transfer is effected dot line per dot line via receiver 54 (Fig. 3*b*), the cathode ray distributor 55 and the printing unit 50. The transmitted or received pulses are conducted from the receiver to the filters 56 and 57 of which the filter 57 passes lower frequencies, such as the synchronizing frequencies, whereas the filter 56 passes higher frequencies, such as the pulses representing the characters to be printed.

The lower frequency passed by the filter 57 is amplified in pentode 58 controlling, after the amplification, the deflection plate system 59 and 60, the voltages being chosen in such a way that the voltages at deflecting plate system 59 are phase-shifted by 90 degrees compared with the voltage controlling the deflecting system 60. The amplification of the two pulses by pentode 61 controls the intensity of the cathode ray in the cathode ray tube 55 according to whether or not, at the moment concerned the control electrode 62 becomes less negative than its bias. As the rotation of the cathode ray in the cathode ray distributor 41 at the transmitting station is effected by the same control frequency as controls the rotation of the cathode ray in the distributor 55, the cathode ray of the cathode ray distributor screen 48 passes at every moment of the cycle the sector in distributor 46 corresponding to the secor passed over by the cathode ray of the cathode ray distributor 55. This single control frequency can be taken from a storage drum or a storage tape or from a synchronizing generator, which may produce the two alternating currents, the voltages of which are relatively shifted by 90 degrees by an off-set arrangement of their windings. The printing can likewise be effected by the multi-column unit 50 via the ignition of the control discharge tubes 49$^{1-n}$ which are connected to the different sectors of the cathode ray distributor screen 63.

The movement of the main shaft, corresponding to main shaft 5 of Fig. 1, is controlled by an arrangement similar to magnetic systems 7 and 8 of Fig. 1.

Instead of controlling printing levers or the like by the combination of the cathode ray distributor and discharge tubes or the like, almost any data synchronizing can be achieved, even over great distances and with great accuracy.

The pulses controlling the movement of the main shaft of the printing unit can be used also as synchronization pulses for the sawtooth movement of a discharge circuit, to the capacitor of which the horizontal deflecting plates of a cathode ray tube are connected in parallel. If in this case the cathode ray tube has the ordinary luminescent screen and the pulses amplified via pentode 61 are applied to the control electrode of the cathode ray tube 55, the printing dot lines can be made visible on the screen of the cathode ray tube due to the fact that within every horizontal line the intensity of the cathode ray will be controlled in accordance with the transmitted type character pulses.

By means of the plug board 51 the arrangements of the type character rows on the paper sheet can be chosen simply by corresponding connections between coils 3$^{1-n}$ and discharge tubes 49$^{1-n}$.

The type character coding device, coding the type character symbol pulses into printable or visible type character pulse sequences, is described in my copending patent application, Serial No. 498,055, filed March 30, 1955.

What I claim is:

1. A means for transmission of signals and comprising, in combination, an input means for producing input signals in serial order; output means for producing output signals; and at least one electronic distributor for converting input signals received in serial order from said input means into signals of said output means effective in parallel order.

2. A control and operating means for multi-column printers or teletypers operating on the dot or line principle, comprising, in combination, input means for producing input signals in serial order for each row of dots or lines; output means for producing output signals; at least one electronic distributor for converting input signals received from said input means and corresponding to such a row into signals of said output means effective in parallel order.

3. A means as set forth in claim 2 and including a plurality of printing means; and wherein a plurality of electronic distributors operate as a synchronizing means between said plurality of printing means.

4. A means as set forth in claim 2 including printing means, and wherein said distributor includes means for synchronization and for signal transmission.

5. A means as set forth in claim 4 wherein said distributor includes a cathode ray tube having two deflection systems, one of said deflection systems being provided for synchronization and the other of said deflection systems being provided for the transmission of signals.

6. A teletyping apparatus for printing in several columns simultaneously and comprising transmitting stations, receiving stations and signal transmission lines between said transmitting stations and receiving stations, the number of said lines being smaller than the number of the columns to be printed; and electronic distributing means for distributing printing impulses to the respective columns in parallel order.

7. The method of printing characters including the steps of feeding to a cyclically operating distributor signals representing the matter to be printed in series order; and rearranging the signals in parallel for operating a printing means.

8. A method as set forth in claim 7 and including the step of storing part of signals fed to the distributor, and wherein the signals are simultaneously fed to the printing means.

9. A method as set forth in claim 8 wherein the signals fed to the distributor comprise sequences representing side-by-side characters, and wherein said signals are stored in side-by-side relationship, and including the step of sensing said last-mentioned signals.

10. A control and operating means for a multi-column character printer in which lines of printed characters are formed by a plurality of separate impressions arranged in rows parallel to each other, comprising, a source of input signals representing in serial order the impressions to be made in one of said rows; an electronic distributor for rendering signals received from said source effective in parallel order; and means for synchronizing the operation of said distributor with the operation of said input signal source.

11. A multi-column character printing apparatus, comprising, a printing mechanism with a plurality of printing members for each character position of a line of characters; an input source of serially occurring signals representing characters to be printed; control means respectively associated with each of said printing members; an electronic distributor operative to distribute and to feed signals selectively and sequentially to said control means; means for synchronizing the operation of said distributor with the operation of said input source; and means for rendering control means associated with a plurality of said printing members simultaneously responsive to selected signals from said distributor.

12. Printing apparatus for the printing of characters in a plurality of character positions arranged in a line, comprising, a plurality of printing devices for each said character position, respectively; a plurality of control means for individually operating said printing devices, respectively, each control means being repeatedly and selectively operable in response to electrical signals to build up a printed character by a plurality of impressions arranged in parallel rows; a signal source of electrical input signals representing in serial order within a cycle the impressions to be made in one row containing all the character positions and in successive cycles the impressions to be made in different ones of said rows; a cyclically operating electronic distributor interconnecting said signal source and said plurality of control means; and means responsive to signals from said input source to synchronize the operation of said distributor.

References Cited in the file of this patent

UNITED STATES PATENTS

| | | |
|---|---|---|
| 2,361,766 | Hadekel | Oct. 31, 1944 |
| 2,575,017 | Hunt | Nov. 13, 1951 |
| 2,706,215 | Van Duuren | Apr. 12, 1955 |
| 2,724,739 | Harris | Nov. 22, 1955 |
| 2,735,889 | Canfora | Feb. 21, 1956 |